United States Patent
Hoeger et al.

[11] Patent Number: 6,017,186
[45] Date of Patent: Jan. 25, 2000

[54] ROTARY TURBOMACHINE HAVING A TRANSONIC COMPRESSOR STAGE

[75] Inventors: Martin Hoeger, Erding; Uwe Schmidt-Eisenlohr, Munich, both of Germany

[73] Assignee: MTU-Motoren-und Turbinen-Union Muenchen GmbH, Ottobrunn, Germany

[21] Appl. No.: 08/984,606

[22] Filed: Dec. 3, 1997

[30] Foreign Application Priority Data

Dec. 6, 1996 [DE] Germany ................... 196 50 656

[51] Int. Cl.$^7$ .................. F01D 1/10; F01D 1/02; B64C 11/00

[52] U.S. Cl. .................. 415/181; 415/914; 415/191; 415/192; 415/195; 416/193 A; 416/248; 416/219 R; 416/220 R

[58] Field of Search ............... 416/193 A, 248, 416/219 R, 220 R; 415/914, 191, 192, 195, 181

[56] References Cited

U.S. PATENT DOCUMENTS

| | | | |
|---|---|---|---|
| 2,805,818 | 9/1957 | Ferri | 415/148 |
| 4,135,857 | 1/1979 | Pannone et al. | 416/193 A |
| 4,465,433 | 8/1984 | Bischoff. | |
| 4,795,312 | 1/1989 | Purcaru | 416/223 A |
| 5,228,833 | 7/1993 | Schoenenberger et al. | 415/181 |
| 5,397,215 | 3/1995 | Spear et al. . | |
| 5,554,000 | 9/1996 | Katoh et al. | 415/208.2 |

FOREIGN PATENT DOCUMENTS

| | | |
|---|---|---|
| 579989 | 7/1933 | Germany. |
| 1426862 | 5/1969 | Germany. |

*Primary Examiner*—Edward K. Look
*Assistant Examiner*—Rhonda Barton
*Attorney, Agent, or Firm*—W. F. Fasse; W. G. Fasse

[57] ABSTRACT

A rotary turbomachine, and particularly a turbojet engine, has a compressor stage that is especially adapted for operation in the transonic region. The compressor stage includes a rotor (1) having a hub (2) and a plurality of compressor blades (3) extending radially therefrom, and a stator having a plurality of compressor blades extending radially between a stator hub and a housing. The hub (2) of the rotor (1), and/or the hub of the stator, and/or the housing of the stator, have a circumferential surface contour that is not continuously rotationally symmetrical. Namely, a concave contour (K) is provided in the circumferential surface of the hub near the base of each blade (3) on the pressure side (PS) thereof, while the circumferential surface on the suction side (SS) of the base of each blade has a contour that is linear, slightly convex, convex/concave, or slightly concave to a lesser degree than the concave contour (K) on the pressure side of each blade. The hub contour slopes and transitions smoothly radially outwardly from the concave contour (K) on the pressure side to the flatter or convex contour on the suction side. In this manner, fluid flow velocities on both the pressure side and the suction side of each blade are reduced, especially under transonic operating conditions, and compression shock losses can be minimized.

24 Claims, 4 Drawing Sheets

6,017,186

ROTARY TURBOMACHINE HAVING A TRANSONIC COMPRESSOR STAGE

PRIORITY CLAIM

This application is based on and claims the priority under 35 U.S.C. §119 of German Patent Application 196 50 656.5-13, filed on Dec. 6, 1996. The entire disclosure of German Patent Application 196 50 656.5-13 is incorporated herein by reference.

FIELD OF THE INVENTION

The invention relates to a rotary turbomachine, and more particularly a gas turbine machine and especially a turbojet engine, having a compressor stage that operates in the transonic region and that includes a rotor comprising a hub and a plurality of compressor blades extending radially from the hub, and/or a stator comprising a hub, a housing, and a plurality of compressor blades extending radially between the hub and the housing.

BACKGROUND INFORMATION

In rotary turbomachines having a compressor stage operating in the transonic region, the problem has been recognized that an excessive Mach number of the fluid flow arises on the suction side of the compressor blades, especially in the vicinity of the hub and/or the housing, due to the finite thickness of the compressor blades, and the consequent effect on the flow conditions. As a result, the danger of boundary layer separation arises on the suction sides of the blades.

In the general field of aircraft construction, and particularly aircraft fuselage construction, it has been known since about 1940 to constrict or narrow the aircraft fuselage so as to have a concave waist in the area of the wing roots in order to provide additional space for the airflow that has been accelerated due to the finite thickness of the wings, especially along the wing roots. In this manner, it has been attempted to avoid the occurrence of excessive velocities and boundary layer separations of the airflow over the wing. Such arrangements are generally known in the context of the so-called surface area rule, and are generally represented in FIG. 1.

Problems would arise if one would attempt to apply the concepts of the above mentioned surface area rule to the construction of the compressor stage of a turbine engine or other rotary turbomachine. If the hub or the housing at the respective root or tip end of the compressor blades of a compressor operating in the transonic region were simply concavely shaped so as to increase the surface area according to the surface area rule, then the resulting configuration would effectively create a supersonic nozzle at any areas operating under supersonic conditions. Such a supersonic nozzle would consequently lead to an undesirable increase of the Mach number of the airflow at these locations. Namely, while such an increase in surface area leads to an improved flow condition under subsonic conditions, this is not true under supersonic conditions, in which the surface area increase would actually cause higher Mach numbers due to the nozzle effect and would thus result in higher shock losses in the locally occurring supersonic fields on the suction sides of the compressor blades in the vicinity of the hub.

SUMMARY OF THE INVENTION

In view of the above, it is an object of the invention to provide a rotary turbomachine having an improved compressor stage for operation under transonic conditions, and particularly to provide an improved configuration for the hub wall or housing wall bounding the respective inner and outer ends of the compressor blades, whereby the Mach number of the flow over the blades can be reduced and the resulting shock losses can be reduced. Further objects of the invention are to avoid or overcome the disadvantages of the prior art, and to achieve additional advantages, as apparent from the present description.

The above objects have been achieved in a rotary turbomachine according to the invention having a compressor stage that is adapted for operation in the transonic region and that includes a rotor comprising a hub and a plurality of compressor blades extending radially from the hub and/or a stator comprising a hub, a housing, and a plurality of compressor blades extending radially between the hub and the housing. Each of the blades is understood to have a pressure side on which the fluid flow has a higher pressure and a suction side on which the fluid flow has a lower pressure. According to the invention, the outer circumferential surface of the hub of the rotor and/or the hub of the stator, and/or the inner circumferential surface of the housing of the stator has a sectional profile that varies around a circumference thereof, that has a respective pressure side contour adjacent each one of the blades respectively on the pressure side thereof, and that has a respective suction side contour adjacent each one of the blades respectively on the suction side thereof, whereby the suction side contour is different from the pressure side contour.

More specifically, the pressure side contour has a first axial section profile shape adapted to reduce the velocity of a subsonic fluid flow respectively on the pressure sides of the blades, and the suction side contour has a second axial section profile shape adapted to reduce the velocity of a supersonic fluid flow respectively on the suction sides of the blades. In specific configurations for achieving this feature, each pressure side contour comprises a first concave contour, while each suction side contour comprises a second concave contour that is less concave than the first concave contour of the pressure side, or a linear contour, or a convex contour, or a combination convex/concave contour. In each case, these contours are described as seen on an axial section plane.

It is an important feature of specific embodiments of the invention, therefore, that the circumferential surface of the hub near the blade roots and/or of the housing near the blade tips, has a concave contour only on the pressure side of the blades, while the circumferential surface has a flat linear contour, or a slightly convex contour, or a combination convex/concave contour, or a less-concave contour, on the suction side of each blade. The configuration of the compressor stage according to the invention achieves a two-fold advantage. First, the subsonic flow velocity is reduced on the pressure side of the compressor blades due to the concave contour provided in the hub and/or the housing on the pressure side of each blade. Secondly, on the suction side of the blades and in the incident flow, an undesirable increase in the Mach number of the supersonic fluid flow and thus the resulting shock losses as well as the danger of a boundary layer separation are reduced or avoided by the provision of a different contour, and especially a non-concave or less-concave contour, in the hub or housing on the suction side of each blade.

According to a particular embodiment of the invention, the hub contour comprises a concave curved contour, as seen on an axial section plane, in the vicinity of the pressure side of each blade. According to one advantageous detail of such an embodiment, the concave curved contour extends essentially over the entire axial length of the respective compressor blade. Furthermore, or alternatively, it is advantageous if the concave hub contour has a smooth transition region at each axial end thereof, comprising a convexly curved portion that smoothly transitions into the surface contour of the remainder of the hub circumference over which the concave contour does not extend.

Further according to the invention, the circumferential contour of the hub or housing, when seen on a radial section plane, has a sloping portion between each two adjacent blades, namely extending and transitioning smoothly from the concave contour provided on the pressure side of one blade to the non-concave or other contour provided on the suction side of the next adjacent blade. This slope of the hub contour relative to the compressor blades causes additional radial forces effective on the fluid flow, which lead to a redistribution of the fluid flow. In this manner, secondary flows are reduced or weakened and the overall flow quality in the area of the hub section is further improved.

More specifically, the sloping contour portion preferably has a flat linear slope that rises or slopes up from the minimum hub radius in the concave contour adjacent the pressure side of the blades to the maximum hub radius at the flat or non-concave contour adjacent the suction side of the blades. Alternatively, the sloping hub surface between adjacent blades can have a smooth transition curvature that first curves concavely and then curves convexly while transitioning from the concave contour on the pressure side of one blade to the different contour on the suction side of the next adjacent blade. Preferably, the sloping hub surface slopes at an angle of at most 20° relative to a tangent to the outer circumference of the hub, and more preferably the slope is less than 10° and most preferably in the range from 2.5° to 7.50°.

According to a further feature of the invention, each compressor blade may be integrally formed as one piece including a respective blade root or pedestal base portion, whereby the above described concave hub contour is formed segment-wise in each respective blade root portion. The respective blade root portions of all the compressor blades assembled together then form the outer circumferential surface of the compressor hub.

BRIEF DESCRIPTION OF THE DRAWINGS

In order that the invention may be clearly understood, it will now be described, in connection with example embodiments with reference to the accompanying drawings, wherein.

DETAILED DESCRIPTION OF PREFERRED EXAMPLE EMBODIMENTS AND OF THE BEST MODE OF THE INVENTION

Figure 1:
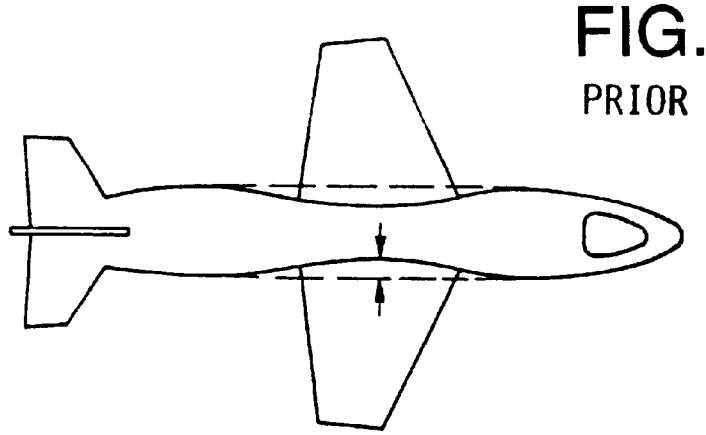
FIG. 1 is a schematic plan view of an aircraft having a known tapered concave fuselage configuration according to the so-called surface area rule.
Figure 2:
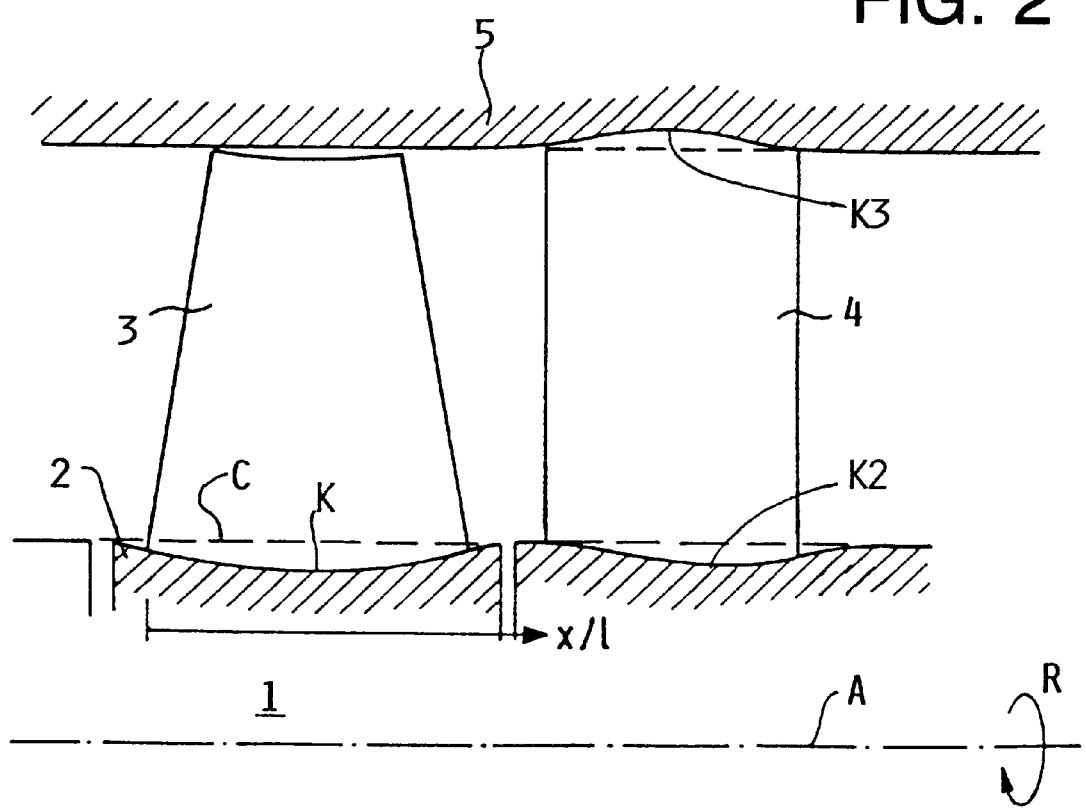
FIG. 2 is a schematic axial section through a compressor stage of a rotary turbomachine, in which the hub of the rotor is uniformly concavely contoured generally in accordance with the surface area rule.

FIG. 2 is a simplified schematic illustration of an axial section through a portion, and specifically a compressor stage, of a turbojet engine, which may be used for propelling a high power or high capacity aircraft, for example. The compressor stage of the jet engine includes a rotor disk 1 and a stator 4 arranged in a housing 5. The rotor disk 1 includes a hub 2 and a plurality of compressor blades 3 extending radially from the hub 2, whereby each of the compressor blades 3 has an aerodynamic profile. A plurality of stator blades 4 extend radially between and are connected to a non-rotating stator hub and the non-rotating housing 5. As the rotor 1 rotates about its axis A in the rotation direction R, a flow of air is compressed and caused to flow toward the right in FIG. 2 due to the pressure difference between the pressure side and the suction side of each one of the compressor blades 3, which is caused by the respective aerodynamic profile and arrangement thereof. FIG. 2 further shows that the hub 2 has a concave contour K near the base or root of each compressor blade 3, and also a concave contour K2 near the root of each compressor stator blade 4, while the housing 5 has a similar concave contour K3 near the tip or outer end of each stator blade 4. The blade's axial dimension is indicated by the range or length x/l.

Figure 3A:
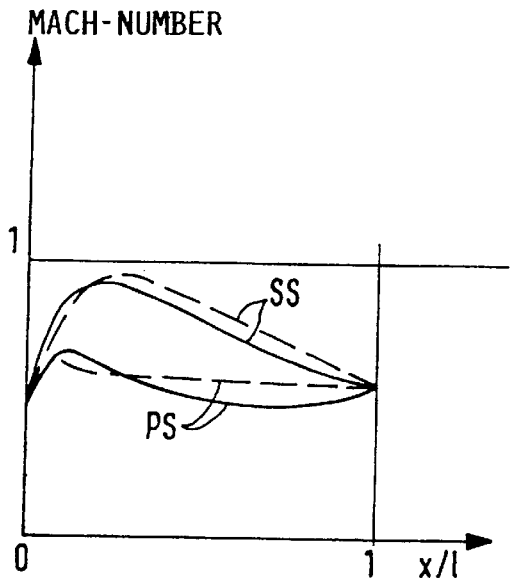
FIG. 3A is a diagram showing the dependence of the fluid flow Mach number over the axial length of the compressor blade shown in FIG. 2, near the hub thereof, for subsonic flow conditions.
Figure 3B:
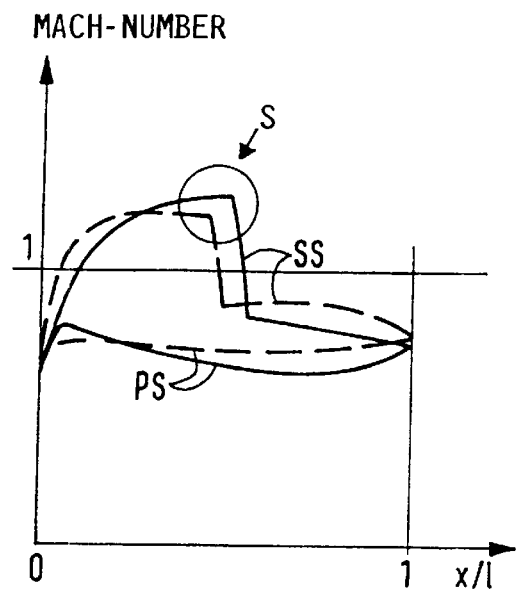
FIG. 3B is a diagram showing the dependence of the fluid flow Mach number over the axial length of the compressor blade shown in FIG. 2, near the hub thereof, for transonic flow conditions.

FIGS. 3A and 3B show the variation of fluid flow velocity as a Mach number relative to the position along the axial length x/l of the compressor rotor blade 3 directly adjacent the hub 2 according to FIG. 2, under different operating speed conditions. More specifically, FIG. 3A shows the fluid flow Mach number distribution for subsonic conditions, while FIG. 3A shows the fluid flow Mach number distribution for transonic conditions in which at least some areas of fluid flow are supersonic.

In the diagram of FIG. 3A, the solid line shows the velocity distribution along the pressure side PS and the suction side SS of the blade 3 on the hub 2 having a circumferentially symmetrical and uniform concave contour K provided therearound as shown by the solid line in FIG. 2. For comparison, a dashed line in FIG. 3A shows the velocity distribution along the pressure side PS and suction side SS of a compressor blade on a hub that has a uniform cylindrical hub contour as is shown by the dashed line C in FIG. 2, without the concave contour K. As can be seen by comparing the two velocity distributions, i.e. the solid line and the dashed line in FIG. 3A, the provision of a uniform concave contour K on the hub 2 reduces the fluid flow velocity on both the pressure side PS and the suction side SS of each blade. This is particularly true for areas away from the leading edge of the blade and over most of the body of the blade toward the trailing edge.

FIG. 3B shows the velocity distributions for the same two blade and hub configurations as in FIG. 3A, but for a higher fluid flow Mach number, i.e. for operation in the transonic region. More specifically, the solid line in the diagram of FIG. 3B represents the velocity distribution on the pressure side PS and the suction side SS of a compressor blade 3 mounted on a hub 2 having a circumferentially symmetrical and uniform concave contour K, in the case of high transonic fluid flow Mach numbers. The dashed line in FIG. 3B represents the velocity distribution for a hub having a cylindrical circumferential surface without the concave contour K. In this transonic case, the flow Mach number on the suction side SS exceeds the value 1 so that a compression shock S occurs, whereby an abrupt reduction in velocity and shock losses necessarily arise. As can be seen by comparing the solid line and the dashed line in FIG. 3B, the pressure side PS flow remains in the subsonic operating region, whereby the hub configuration having the concave contour K once again achieves a reduction in the flow velocity. However, for the flow operating in the transonic region on the suction side SS, the flow velocity is actually increased by the provision of a concave contour K on the outer circumference of the hub. This increased flow velocity leads to an increase in the shock losses, and is therefore undesirable. This result can be explained in that the concave contour K has the effect of a supersonic nozzle for transonic operating conditions on the suction side SS of each blade.

Figure 4A:
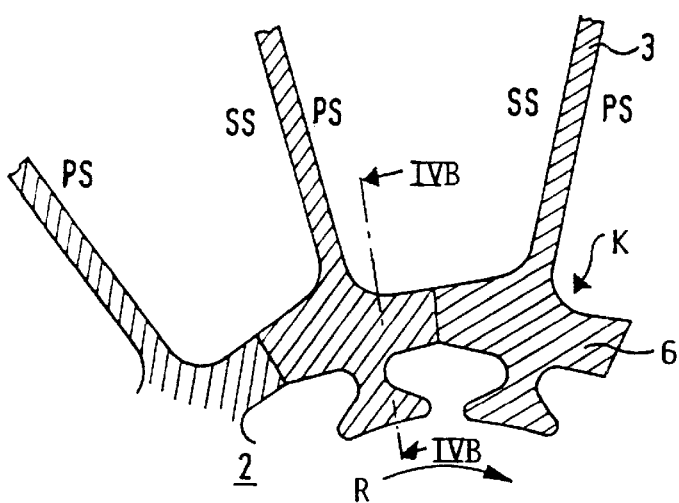
FIG. 4A is a sectional view through a compressor rotor arrangement according to an example embodiment of the invention having a concave contour K in the hub surface on the pressure side of each blade, taken along the radial section plane IVA—IVA shown in FIG. 4B.
Figure 4B:
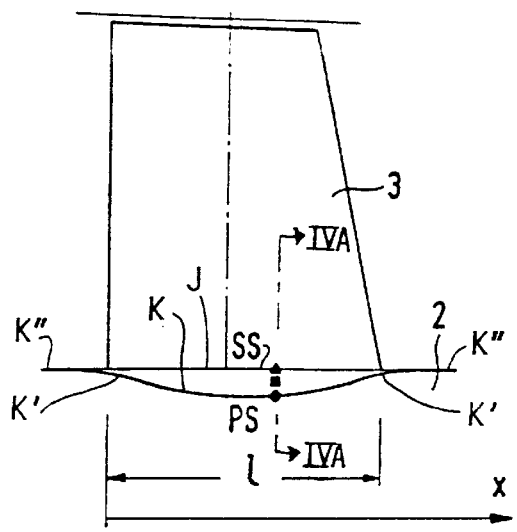
FIG. 4B is a schematic axial section of a compressor blade of the inventive rotor configuration shown in FIG. 4A, taken along the axial section plane IVB—IVB shown in FIG. 4A of an embodiment with a linear suction side contour J.

In order to avoid or reduce the transonic shock losses explained above in connection with FIG. 3B, the invention provides a hub contour that is not symmetrical and uniform continuously around the circumference of the hub. Instead, the circumferential surface of the hub has an axial section profile shape that is different on the pressure side of each blade as compared to the suction side of each blade. FIG. 4A shows a radial section through a portion of a compressor rotor 1 according to one example embodiment of the invention, wherein the hub 2 is provided with a concave contour K (which is concave when viewed in an axial section as shown in FIG. 4B) only on the pressure side PS of each blade 3 near the root or base thereof, while the hub 2 has a non-concave contour J on the next adjacent suction side SS of each compressor blade 3. The hub contour J in the vicinity of or along the blade root on the suction side SS thereof may have a flat linear contour J (shown in FIG. 4B), a lightly convex contour, J (shown in FIG. 4F), or a convex/concave contour J (shown in FIG. 4E), e.g. especially concave near the leading edge and convex elsewhere, or the converse, or even a slightly concave contour J (shown in FIG. 4D) that is less concave than the contour K provided on the pressure side PS of each blade 3, wherein the respective shape of each of the above mentioned contours J and K is described as seen on an axial section plane through the rotor.

The view of FIG. 4A is a radial section taken along the line IVA—IVA in FIG. 4B, while FIG. 4B is an axial section taken along the line IVB—IVB in FIG. 4A. FIGS. 4D, 4E and 4F are generally similar to FIG. 4B, but show embodiments with different curvatures of the suction side contour J as described above. By viewing these two figures together, the concavely curved contour K provided in the circumferential surface of the hub 2 at the root or base of each blade 3 on the pressure side PS thereof can be understood. This concave contour K extends substantially over the axial length L of the blade 3. At the axial beginning and axial end of the concave curvature of the contour K, there is a smooth transition into the remaining non-contoured portions of the hub 2, for example cylindrical hub surface portions K" at the leading and trailing edges thereof. In the illustrated embodiment, a small convexly curved portion K' forms the transition from the concave contoured portion K into a smooth uniform cylindrical portion K" of the hub 2 on each side, as shown in FIG. 4B.

Figure 4C:
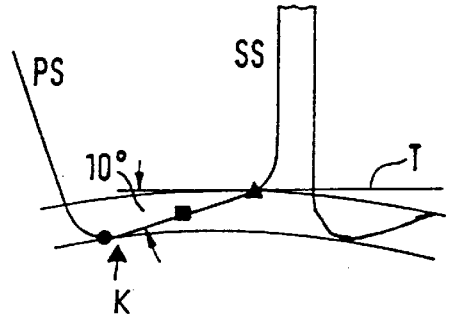
FIG. 4C is a schematic detail portion of FIG. 4A, showing angular and positional relationships of the contour of the hub in connection with FIGS. 4A and 4B.
Figure 4D:
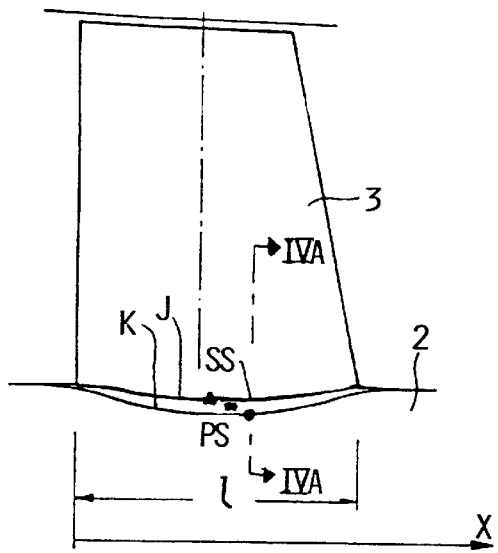
FIG. 4D is a schematic axial section similar to FIG. 4B, but showing an alternative embodiment in which the suction side contour J is slightly concave.
Figure 4E:
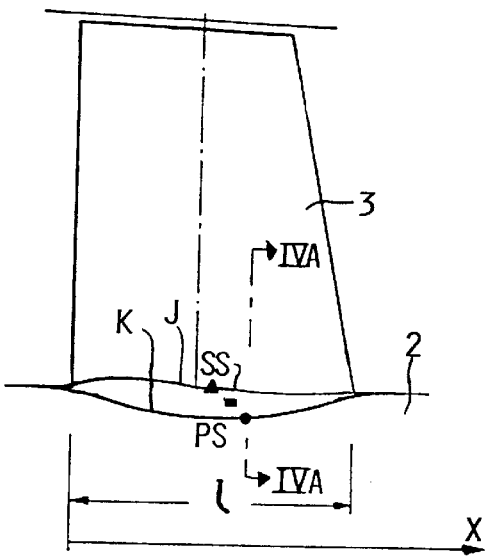
FIG. 4E is a schematic axial section similar to FIG. 4B, but showing another alternative embodiment in which the suction side contour J is a compound convex/concave contour.
Figure 4F:
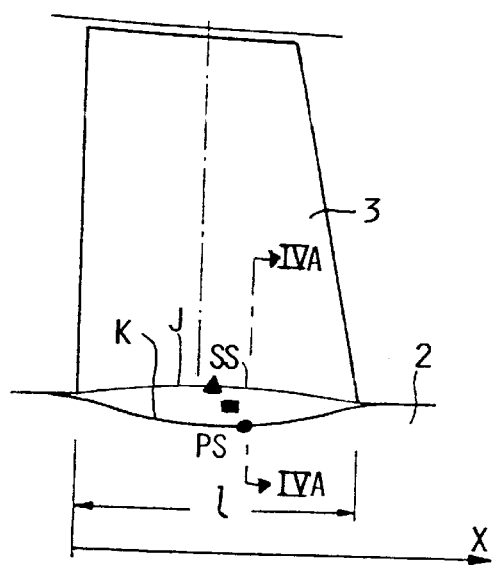
FIG. 4F is a schematic axial section similar to FIG. 4B, but showing a further alternative embodiment in which the suction side contour J is slightly convex.

FIG. 4C is a schematic view of a detail portion of FIG. 4A. As shown in these two figures, the concave hub contour K, when seen in radial section, has its greatest depth at a location close to the blade root or pedestal base on the pressure side PS thereof, and then rises, i.e. has an ever increasing radius relative to the rotor axis A, from there to the suction side SS of the next adjacent blade 3. The contour slopes smoothly from the deepest location, i.e. the smallest radius, to the highest location, i.e. the greatest radius, and in the illustrated embodiment this slope is essentially linear, flat and straight.

The solid black circle symbol • in FIG. 4C identifies the location of the greatest depth of the hub contour K directly in the vicinity of the blade root or base at the pressure side PS thereof. From there, the hub contour K rises in an essentially linear slope region marked with a solid black square symbol ■, toward the suction side SS of the next adjacent blade 3. At this location marked by the solid black triangle symbol ▲, the hub contour K transitions into the non-contoured circumference of the hub 2, i.e. the cylindrical outer surface of the hub 2. Moreover, the respective hub contour on both the pressure side PS and the suction side SS, transitions through a smooth curve into the respective profile of the compressor blades 3.

FIG. 4C further illustrates the angular relationships of the hub contour K relative to a tangent T to the circular hub circumference at the area of the greatest depth of the hub contour K. The angle between the tangent T and the flat linear slope of the contoured area K transitioning from the pressure side to the suction side is an acute angle less than 20°, and in the illustrated embodiment is a maximum of 10°.

As further shown in FIG. 4A, the outer circumferential surface of the hub 2 is formed in a segmented manner by the respective blade roots or pedestal bases 6 of the blades 3, whereby each blade 3 has an integral one piece construction including the blade itself and the blade pedestal base 6. The blade pedestal bases 6 are formed or shaped such that the concave hub contour K is formed in a segment-wise manner on these blade pedestal bases 6.

Figure 5:
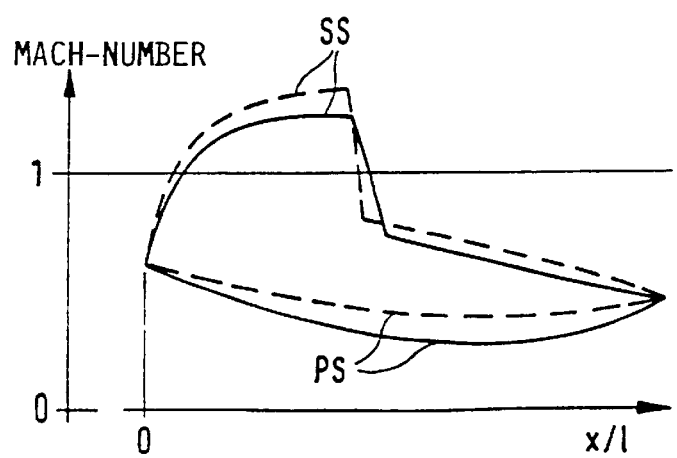
FIG. 5 is a diagram showing the dependence of the Mach number of the fluid flow over the axial length of the compressor blade in the vicinity of the hub, in the inventive configuration shown in FIG. 4, operating under transonic conditions.

FIG. 5 shows the velocity distribution of the fluid flow along the compressor blades in the vicinity of the hub for a compressor rotor according to the embodiment of FIGS. 4A to 4C. More particularly, FIG. 5 shows the velocity distribution for operation under transonic conditions, whereby flow velocities above Mach 1 occur on the suction side SS of the blades. The dashed line shows the velocity profile of a compressor rotor having a uniform hub without any concave contours therein, while the solid line shows the velocity distribution for the present inventive embodiment of a compressor rotor, having a concave contour on the pressure side PS of each rotor blade 3, which slopes radially outwardly and transitions into a flat, smooth circumferential contour of the hub 2 on the suction side SS of each rotor blade 3.

As can be seen in FIG. 5, the inventive hub configuration having the concave contour K on the pressure side PS of each blade reduces the flow velocity on the pressure side relative to the non-contoured cylindrical hub, similarly as in the case described above in connection with FIG. 3B. However, in contrast to the velocity profile shown in FIG. 3B, the present inventive configuration avoiding the concave contour on the suction side of the blades also manages to reduce the flow velocity under transonic flow conditions for a Mach number greater than 1 on the suction side SS of each blade. Simultaneously, the compression shock is reduced, as can be seen from the reduced absolute height of the compression shock and the reduced gradient or slope of the abrupt velocity transition occurring in connection with the compression shock.

Thus, a substantially improved flow dynamic condition in the vicinity of the hub, and therewith a considerable reduction in shock losses, are achieved according to the invention by providing an asymmetrical or circumferentially non-uniform and noncontinuous concave hub contour K between every two neighboring or adjacent compressor blades 3 particularly adjacent the pressure side of each blade, so as to advantageously influence the flow velocities on both the pressure side and the suction side of the blade. As a result, it is especially possible to achieve a higher power output, a greater operating efficiency, and a reduction in fuel consumption in turbojet engines operating in the transonic region.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A rotary machine having a compressor stage adapted for operation under transonic flow conditions, comprising a hub, a plurality of blades respectively extending radially outwardly from said hub, and a cylindrical housing arranged radially outwardly around said blades;

wherein each one of said blades has a pressure side adapted to cause fluid flow therealong at a higher relative pressure and a suction side adapted to cause fluid flow therealong at a lower relative pressure;

wherein at least one of said hub and said housing has a circumferential surface with a sectional profile that varies around a circumference thereof, said sectional profile has a respective pressure side contour adjacent each one of said blades respectively on said pressure side thereof, and said sectional profile has a respective suction side contour adjacent each one of said blades respectively on said suction side thereof which is different from said pressure side contour; and wherein each said pressure side contour has a first axial section profile shape adapted to reduce the velocity of a subsonic fluid flow respectively on said pressure sides of said blades, and each said suction side contour has a second axial section profile shape adapted to reduce the velocity of a supersonic fluid flow respectively on said suction sides of said blades.

2. A rotary machine having a compressor stage adapted for operation under transonic flow conditions, comprising a hub, a plurality of blades respectively extending radially outwardly from said hub, and a cylindrical housing arranged radially outwardly around said blades;

wherein each one of said blades has a pressure side adapted to cause fluid flow therealong at a higher relative pressure and a suction side adapted to cause fluid flow therealong at a lower relative pressure;

wherein at least one of said hub and said housing has a circumferential surface with a sectional profile that varies around a circumference thereof, said sectional profile has a respective pressure side contour adjacent each one of said blades respectively on said pressure side thereof, and said sectional profile has a respective suction side contour adjacent each one of said blades respectively on said suction side thereof which is different from said pressure side contour; and wherein each said pressure side contour comprises a first concave contour, and each said suction side contour comprises one of a second concave contour that is less concave than said first concave contour, and a linear contour.

3. The rotary machine according to claim 2, wherein each said contour is defined as seen on an axial section plane.

4. The rotary machine according to claim 2, wherein said suction side contour comprises said second concave contour.

5. The rotary machine according to claim 2, wherein said suction side contour comprises said linear contour.

6. The rotary machine according to claim 3, wherein said hub is a a rotatable rotor hub, said housing is a non-rotatable housing, said blades are connected at radially inner ends thereof to said rotor hub, and are free to rotate relative to said housing, and said circumferential surface is a radially outward surface of said hub.

7. The rotary machine according to claim 3, wherein said hub is a non-rotatable stator hub, said housing is a non-rotatable housing, said blades are connected at radially inner ends thereof to said hub and are connected at radially outer ends thereof to said housing, and said circumferential surface is a radially outward surface of said hub.

8. The rotary machine according to claim 7, further comprising a second one of said circumferential surface, wherein said second circumferential surface is a radially inward surface of said housing.

9. The rotary machine according to claim 3, wherein said hub comprises a plurality of blade pedestal bases that are respectively integrally formed in a one-piece manner with respective ones of said blades, and wherein said blade pedestal bases together segment-wise form said circumferential surface.

10. The rotary machine according to claim 3, wherein said rotary machine further comprises a gas turbine and is a gas turbine machine.

11. The rotary machine according to claim 10, wherein said gas turbine machine is a turbojet engine.

12. A rotary machine having a compressor stage adapted for operation under transonic flow conditions, comprising a hub, a plurality of blades respectively extending radially outwardly from said hub, and a cylindrical housing arranged radially outwardly around said blades;

wherein each one of said blades has a pressure side adapted to cause fluid flow therealong at a higher relative pressure and a suction side adapted to cause fluid flow therealong at a lower relative pressure;

wherein at least one of said hub and said housing has a circumferential surface with a sectional profile that varies around a circumference thereof, said sectional profile has a respective pressure side contour adjacent each one of said blades respectively on said pressure side thereof, and said sectional profile has a respective suction side contour adjacent each one of said blades respectively on said suction side thereof which is different from said pressure side contour;

wherein each said pressure side contour comprises a first concave contour, and each said suction side contour comprises one of a second concave contour that is less concave than said first concave contour, a linear contour, a convex contour, and a combination convex/concave contour;

wherein said sectional profile includes two profile portions that are circumferentially uniform and continuous; and wherein each said pressure side contour further comprises two transition contours that are respectively located at axially opposite ends of said first concave contour and that smoothly transition from said first concave contour into said two profile portions.

13. A rotary machine having a compressor stage adapted for operation under transonic flow conditions, comprising a hub, a plurality of blades respectively extending radially outwardly from said hub, and a cylindrical housing arranged radially outwardly around said blades;

wherein each one of said blades has a pressure side adapted to cause fluid flow therealong at a higher relative pressure and a suction side adapted to cause fluid flow therealong at a lower relative pressure;

wherein at least one of said hub and said housing has a circumferential surface with a sectional profile that varies around a circumference thereof, said sectional profile has a respective pressure side contour adjacent each one of said blades respectively on said pressure side thereof, and said sectional profile has a respective suction side contour adjacent each one of said blades respectively on said suction side thereof which is different from said pressure side contour;

wherein each said pressure side contour comprises a first concave contour, and each said suction side contour comprises one of a second concave contour that is less concave than said first concave contour, a linear contour, a convex contour, and a combination convex/concave contour;

wherein said circumferential surface, as seen on a radial section plane, has a respective smooth transition from each said first concave contour to a respective adjacent one of said suction side contours; and wherein said smooth transition comprises one of:
(a) a radially outward slope that slopes radially outwardly from a minimum radius at said first concave contour to a maximum radius at said suction side contour,
(b) a substantially linear slope transitioning between a first extreme radius of said first concave contour to a second extreme radius of suction side contour; and
(c) a concave curvature followed by a convex curvature transitioning from said first concave contour to said suction side contour.

14. The rotary machine according to claim 13, wherein said smooth transition comprises said radially outward slope.

15. The rotary machine according to claim 13, wherein said smooth transition comprises said substantially linear slope.

16. The rotary machine according to claim 13, wherein said smooth transition comprises said concave curvature followed by said convex curvature.

17. The rotary machine according to claim 13, wherein said smooth transition has a slope angle of not greater than 20° relative to a circumferential tangent of said circumferential surface.

18. The rotary machine according to claim 17, wherein said slope angle is less than 10°.

19. The rotary machine according to claim 17, wherein said slope angle is within the range from 2.5° to 7.5°.

20. A rotary machine having a compressor stage adapted for operation under transonic flow conditions, comprising a hub, a plurality of blades respectively extending radially outwardly from said hub, and a cylindrical housing arranged radially outwardly around said blades;

wherein each one of said blades has a pressure side adapted to cause fluid flow therealong at a higher relative pressure and a suction side adapted to cause fluid flow therealong at a lower relative pressure;

wherein at least one of said hub and said housing has a circumferential surface with a sectional profile that varies around a circumference thereof, said sectional profile has a respective pressure side contour adjacent each one of said blades respectively on said pressure side thereof, and said sectional profile has a respective suction side contour adjacent each one of said blades respectively on said suction side thereof which is different from said pressure side contour; and wherein said hub is a non-rotatable stator hub, said housing is a non-rotatable housing, said blades are connected at radially inner ends thereof to said hub and are connected at radially outer ends thereof to said housing, and said circumferential surface is a radially inward surface of said housing.

21. The rotary machine according to claim 20, further comprising a second one of said circumferential surface, wherein said second circumferential surface is a radially outward surface of said hub.

22. A rotary machine having a compressor stage adapted for operation under transonic flow conditions, comprising a hub, a plurality of blades respectively extending radially outwardly from said hub, and a cylindrical housing arranged radially outwardly around said blades;

wherein each one of said blades has a pressure side adapted to cause fluid flow therealong at a higher relative pressure and a suction side adapted to cause fluid flow therealong at a lower relative pressure;

wherein at least one of said hub and said housing has a circumferential surface with a sectional profile that varies around a circumference thereof, said sectional profile has a respective pressure side contour adjacent each one of said blades respectively on said pressure side thereof, and said sectional profile has a respective suction side contour adjacent each one of said blades respectively on said suction side thereof which is different from said pressure side contour; and wherein each said pressure side contour comprises a first concave contour, and each said suction side contour comprises one of a convex contour and a combination convex/concave contour.

23. The rotary machine according to claim 22, wherein said suction side contour comprises said convex contour.

24. The rotary machine according to claim 22, wherein said suction side contour comprises said combination convex/concave contour.

* * * * *

UNITED STATES PATENT AND TRADEMARK OFFICE
CERTIFICATE OF CORRECTION

PATENT NO. : 6,017,186

DATED : Jan. 25, 2000

INVENTOR(S) : Hoeger et al.

It is certified that error appears in the above-identified patent and that said Letters Patent is hereby corrected as shown below:

| | | |
|---|---|---|
| Col. 3, | line 35, | replace "7.50°." by --7.5°.--. |
| Col. 4, | line 6, | after "FIG. 4A", insert --,--. |
| Col. 5, | line 57, | before "convex", replace "lightly" by --slightly--. |
| Col. 8, | line 30, | after "claim", replace "3" by --2--; |
| | line 36, | after "claim", replace "3" by --2--; |
| | line 46, | after "claim", replace "3" by --2--; |
| | line 52, | after "claim", replace "3" by --2--. |

Signed and Sealed this

Seventeenth Day of October, 2000

Q. TODD DICKINSON

*Attest:*

*Attesting Officer*          *Director of Patents and Trademarks*